June 18, 1968  W. A. MARQUARDT ET AL  3,388,973
MANUFACTURE OF PURE NITROGEN
Filed Feb. 1, 1966  2 Sheets-Sheet 1

INVENTORS.
WILLIAM A. MARQUARDT &
ROY M. BEDNARSKI
BY
Meyer, Tilberry & Body
ATTORNEYS

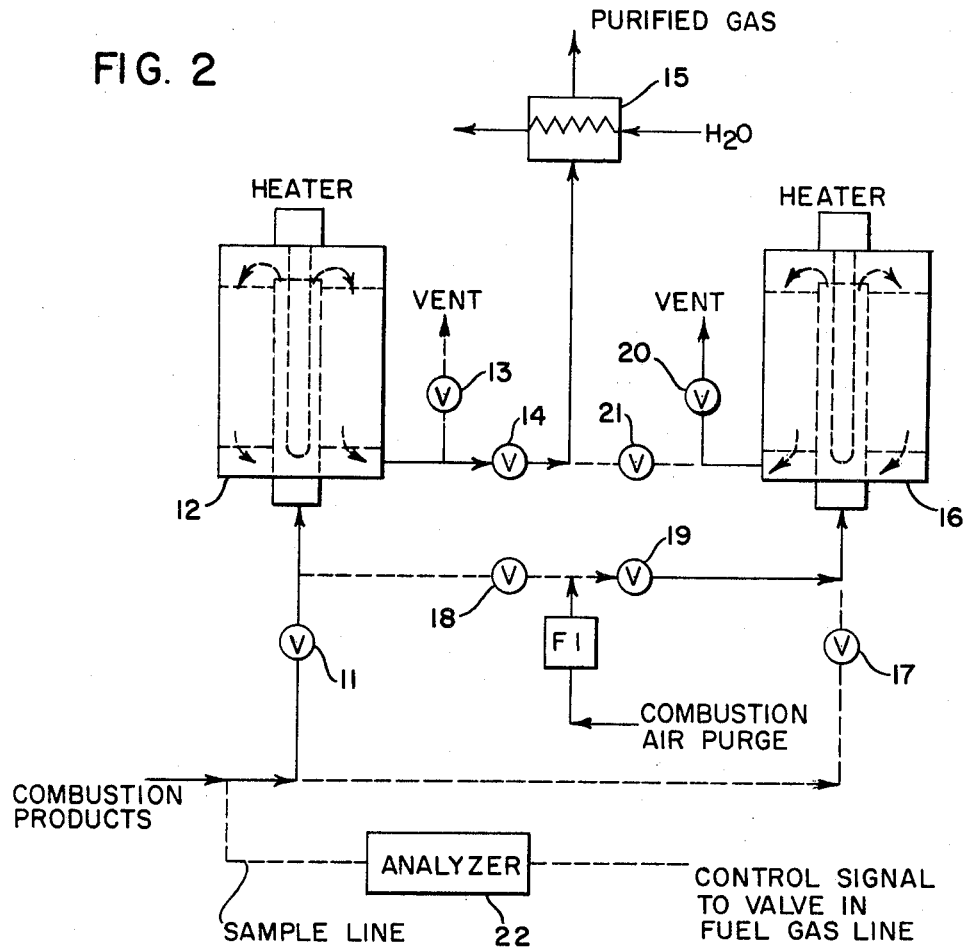

3,388,973
MANUFACTURE OF PURE NITROGEN
William A. Marquardt, Bay Village, and Roy M. Bednarski, Parma Heights, Ohio, assignors to Alco Standard Corporation, Philadelphia, Pa., a corporation of Ohio
Filed Feb. 1, 1966, Ser. No. 524,323
5 Claims. (Cl. 23—220)

ABSTRACT OF THE DISCLOSURE

A cyclic process for the manufacture of nitrogen in which the cycle includes steps (a), (b), (c), (d), (e), and (f) as illustrated:

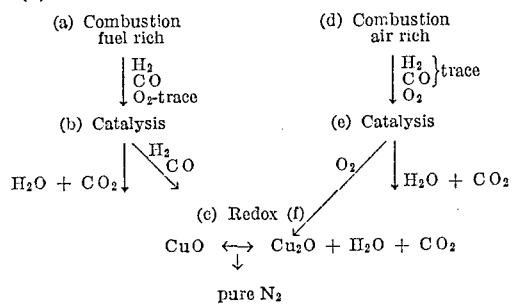

The present invention relates to the production of pure nitrogen by the combustion of a mixture of air and a hydrocarbon fuel gas and subsequent removal of the undesired products of combustion. More particularly, the invention relates to an improved method for producing nitrogen in a relatively pure form through the more effective removal of oxygen, carbon monoxide and hydrogen from the gaseous product resulting from the combustion of a fuel-air mixture.

Heretofore, nitrogen has been produced by burning a mixture of ordinary fuel gas and air in a closed burner and passing the resulting products of combustion, namely nitrogen, $CO_2$ and water vapor, through conventional filters to remove the $CO_2$ and water vapor leaving nitrogen with trace contaminants of $O_2$, CO and $H_2$. To keep these contaminants at a minimum, heretofore the mixture of air and fuel gas has been maintained as close to the exact combining ratio as possible.

It is difficult and expensive to maintain the fuel-air mixture at a precise ratio and even when this is done, traces of $H_2$, CO, or $O_2$ are always present.

Because of the difficulty in maintaining an exact air-to-fuel ratio, where it is necessary to absolutely eliminate the $O_2$ contaminant, the mixture is often adjusted to a slightly fuel-rich condition. In this way, the $H_2$ and CO contaminants are increased but the resulting product is relatively oxygen free.

On the other hand, where it is absolutely necessary to eliminate the CO and $H_2$ contaminants, the mixture is often adjusted to slightly air-rich condition. This results in the substantial elimination of carbon monoxide and hydrogen from the resulting gaseous product but increases the amount of oxygen contaminant.

The $CO_2$ and water vapor, which are normal products of combustion, are easily eliminated by conventional filters. The major problem has been to remove or hold to a minimum the other contaminants, namely CO, $H_2$ and $O_2$.

The present invention eliminates all of the objections discussed above and provides for an improved purity of nitrogen through the use of a method and apparatus which accomplishes the elimination of $H_2$, CO, and $O_2$.

According to the present invention, a fuel-air mixture is burned in a closed chamber adjusted first to a fuel-rich condition for a period of time, then to an air-rich condition, and thereafter cycled back and forth from one condition to the other. The hot gaseous combustion products are passed first through a catalyst such as granulated metal which causes the $O_2$, CO, and $H_2$ to combine to form $CO_2$ and water vapor which are easily removed leaving either $O_2$ or CO and $H_2$ depending on whether the air-fuel mixture was air rich or fuel rich respectively. The gases with either of these contaminants are then passed through a porous bed containing a reversible oxide reactant which in its higher oxide form is reducible at elevated temperatures by $H_2$ and CO to a suboxide. When the fuel-air mixture is adjusted to a fuel-rich condition, the CO and $H_2$ contaminants included with the combustion products react with the reactant to reduce it to a suboxide and to form $H_2O$ and $CO_2$ which are easily filtered out. When at least part of the reactant has been reduced, the fuel-air mixture is adjusted to an air-rich condition whereby the suboxide reacts with the $O_2$ contaminant to eliminate it and is itself returned to its original higher oxide state.

Thus, according to the invention, the air-fuel mixture is cycled back and forth between the air-rich and fuel-rich mixture conditions depending upon the condition of the reversible reactant. The process may of course be made automatic by utilizing an analyzer which continually monitors the condition of the reversible reactant. This information may be relayed to a combustion controller which automatically adjusts the fuel-air mixture. Thus, when the reversible reactant is substantially reduced to a suboxide, the combustion controller will adjust the mixture to an air-rich condition. Accordingly, when the reversible reactant has been substantially oxidized to the higher oxide, the combustion controller will again adjust the mixture to a fuel-rich condition.

The reversible oxide reactant used in accordance with the invention is one which will be reduced at elevated temperatures by $H_2$ and CO to a suboxide. Oxides reducible by $H_2$ and CO are those having a higher free energy of formation than water vapor or $CO_2$, e.g., cupric or ferrous oxides. Other oxides falling within this classification may be determined by referring to the tables of free energy of formation of an oxide in relation to the free energy of formation of $H_2O$ which are published in the chemical tables. Other oxides within this classification may, of course, also be used. The gases should be heated to a temperature of at least 500° F., prior to passing through the porous bed containing the oxide. The optimum temperature will of course depend upon the particular reversible oxide reactant being used.

According to an alternative aspect of the invention, he fuel-air mixture is adjusted to a fuel-rich condition continuously. The gaseous combustion products are passed first through a hot catalyst such as granulated nickel, wherein slight traces of $O_2$ combine with a small amount of the CO and $H_2$ to form $CO_2$ and water vapor which are removed by known processes. This substantially eliminates any trace of $O_2$ in the resulting gases but leaves CO and $H_2$ to be removed. The gases are then passed through a first porous bed containing a reversible oxide as defined above, which is initially in its higher oxide form. The CO and $H_2$ contaminants included with the combustion products reduce the reversible oxide reactant to a suboxide and form $CO_2$ and $H_2O$ which are easily filtered out. After the reversible reactant in the first bed has been substantially reduced, the combustion products are rerouted to a second porous bed containing the reversible reactant in the higher oxide form while a charge of air is passed through the first bed to oxidize the reduced reactant to a higher oxide.

This alternative system may of course also be made automatic through the use of an analyzer adapted to monitor the condition of the reversible reactant in the particular bed being used. When a substantial portion of the oxide in the bed has been reduced, the analyzer relays a signal to a control valve which reroutes the combustion product to the other bed and at the same time routes a charge of air to the reduced reactant.

It is among the objects of the present invention to provide a method of producing pure nitrogen through the combustion of a mixture of air and hydrocarbon fuel gas in which it is not necessary to maintain the fuel-air mixture with an exact combining ratio.

Another object of the invention is to provide a system for the continuous manufacture of pure nitrogen through the combustion of a mixture of air and a hydrocarbon fuel gas which eliminates any requirement for replacing or replenishing materials used during the process for the removal of contaminants and impurities from the combustion product.

Another object is to provide a method of producing pure nitrogen wherein the same reactant can be used for removing trace amounts of $O_2$, and CO and $H_2$.

It is also an object of the invention to provide a system for producing pure nitrogen through the combustion of a mixture of air and a hydrocarbon fuel gas wherein the mixture may be continuously adjusted to a fuel-rich condition and wherein the resulting hydrogen and carbon monoxide contaminants are continuously removed by cycling the combustion products back and forth between two or more beds containing a reversible reactant, the reactant being such that the reacted bed not being used may be easily reversed to a higher oxide condition.

The invention will be better understood by reference to the accompanying drawings which illustrate preferred embodiments of the invention and wherein:

FIGURE 2 is a schematic diagram illustrating a modified form of the invention showing a system for producing pure nitrogen through the combustion of a fuel-air mixture which is continuously adjusted to a fuel-rich condition.

Figure 1:
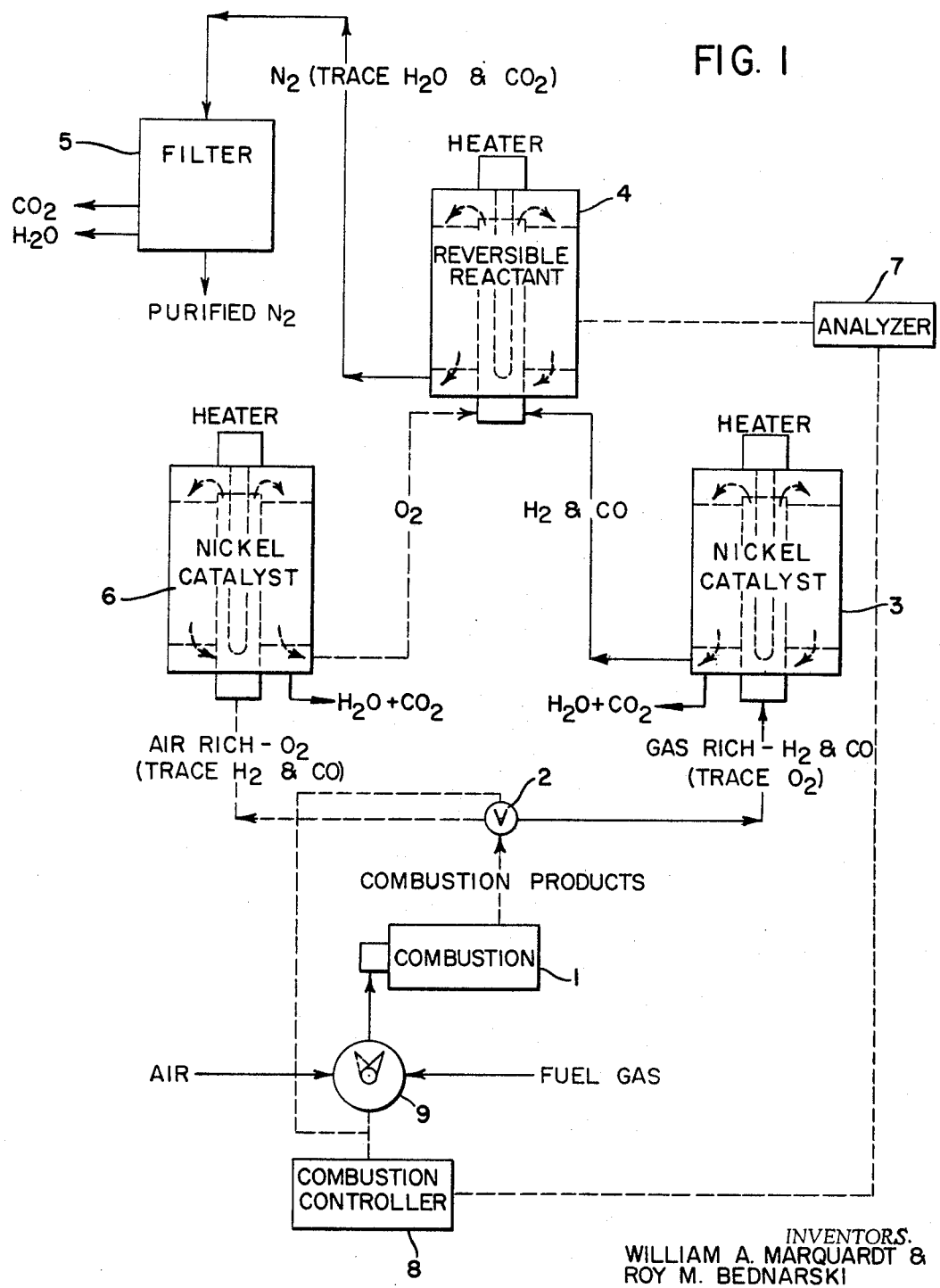
FIGURE 1 is a schematic diagram of a system for producing pure nitrogen according to the present invention.

Referring more particularly to the drawings, FIGURE 1 shows a typical system for utilizing the method of the present invention. The system includes a combustion chamber adapted to receive a charge of air and a hydrocarbon fuel gas such as methane. Inexpensive fuel gases which are readily available in large quantities are of course preferred. The charge is burned within the combustion chamber 1 and the resulting gaseous combustion products are routed through a valve 2. For the purpose of illustration, FIGURE 1 of the drawings utilizes solid flow lines to show the system operating in a fuel-rich condition. In this condition, the gaseous combustion products include large amounts of $N_2$, $CO_2$ and $H_2O$, significant amounts of $H_2$ and CO and a trace of $O_2$.

The valve 2, routes the gases through a heated catalytic bed 3 of granulated nickel, wherein the slight trace of $O_2$ is reacted with the small portion of the $H_2$ and CO to form $CO_2$ and water vapor but still leaving significant amounts of $H_2$ and CO.

According to the present invention the resulting gaseous product is then passed through a porous bed 4 of inert granulated material coated with a reversible reactant which in this instance is an oxide of copper and which at this stage of the process is cupric oxide (CuO).

The gasese are preferably heated to a temperature from 500° F. to 700° F. before entering the bed. If the heat of combustion is insufficient a heater 5 may be provided for this purpose.

The $H_2$ and CO reduce the cupric oxide (CuO) to cuprous oxide ($Cu_2O$), the reaction being as follows:

$$H_2 + CO + 4CuO \rightarrow 2Cu_2O + H_2O\uparrow + CO_2\uparrow$$

Since $H_2$ and CO gases have nearly the same free energy of formation, the reaction will proceed at about the same rate so that substantially all of these gases are reacted to form $CO_2$ and water vapor.

A suitable copper oxide reversible reactant is commercially available under the trade designation "T–317" from Girdler Products Division of Chemetron Corporation located at Louisville, Ky. Other reversible oxides may of course be used provided they are reducible by hydrogen and carbon monoxide to a suboxide at the temperature of operation. The temperature used in this instance is from about 500° F. to 700° F.

Many types of inert materials may be used as carrier for the reactant, activited alumina being particularly suitable.

As the combustion products pass through the bed 4 the cupric oxide (CuO) is reduced by the $H_2$ and CO to cuprous oxide ($Cu_2O$) as indicated above. The resulting gaseous product consists of $N_2$, $CO_2$ and water vapor, the other impurities and contaminants having been removed. This product is then passed through a conventional filter 6 which removes substantially all of the $CO_2$ and water vapor leaving pure nitrogen.

If the system is operated in the fuel-rich condition for a sufficient period of time to reduce all or almost all of the cupric oxide, the system approaches a condition wherein it no longer removes the $H_2$ and CO. At this time or before the fuel-air mixture is readjusted to an air-rich condition, the valve 2 is switched to route the combustion products as shown in dashed flow lines through a second bed 7 containing a nickel catalyst. With the mixture adjusted to an air-rich condition, the combustion products include only a slight trace of $H_2$ and CO but have a significant amount of $O_2$. When the gases are passed through the heated catalytic bed 7, the traces of $H_2$ and CO are removed by their reaction with a portion of the $O_2$ to form water vapor and $CO_2$ leaving $O_2$. The resulting gases are then routed through the porous bed 4 containing the reversible reactant.

At this stage of the process all or a substantial portion of the reactant is in the form of cuprous oxide ($Cu_2O$) due to the reduction which occured during the previous step. Accordingly, as the combustion products pass through the porous bed 4, the $O_2$ reacts with the cuprous oxide to form cupric oxide. The $O_2$ is thus removed.

Again the product is passed through the filter 6 to remove the remaining water vapor and $CO_2$ so that the resulting nitrogen is in relatively pure form.

The process shown is continuous since it is automatically cycled back and forth between the air-rich and fuel-rich mixture conditions. The cycling is accomplished automatically by means of an analyzer 8 which monitors the condition of the reversible reactant. This condition is signaled by the analyzer 8 to a combustion controller 9 which in turn, operates a valve 10 which controls the air-fuel mixture. The combustion controller 9 also controls the valve 2 which routes the combustion product to either one of the two heated catalytic beds 3 and 6.

In this way the entire system is self-contained and does not require periodic replenishment of the materials which remove the contaminants and impurities from the combustion products.

FIGURE 2 shows another embodiment of the invention which is illustrated in the form of a continuous system for producing nitrogen through the combustion of a mixture of air and a hydrocarbon fuel gas wherein the mixture is continuously adjusted to a fuel-rich condition. The combustion chamber is conventional and is not shown, however, the combustion products are shown routed through a portion of the system which illustrates the embodiment of the invention. The combustion products which have been previously treated to remove any traces of $O_2$ are routed as shown by solid flow lines through a valve 11 to a porous bed 12 of inert granulated material coated with cupric oxide as before, wherein the CO and $H_2$ included in the combustion products are removed by the reduction of the cupric oxide to cuprous oxide and the simultaneous formation of $CO_2$ and water vapor.

At this stage in the process the valve 13 is closed and the valve 14 is open to route the resulting gases through a conventional filter 15 which removes the $CO_2$ and water vapor to provide nitrogen in relatively pure form.

When the reversible reactant in the bed 12 has been substantially reduced, the combustion products are rerouted as shown in dashed flow lines to a second porous bed 16 containing the cuprous oxide reactant. This is accomplished by closing the valve 11 and opening the valve 17.

At the same time a charge of air which may be supplied from the same source as the combustion air is routed through the bed 12 to oxidize the reduced reactant ($Cu_2O$) and thus reactivate the bed for subsequent cycling of the system. This is accomplished by opening the valve 18 and closing the valve 19. It will also be noted that at this stage of the operation the valve 14 is closed and the valve 13 is open to vent the excess air charge out of the system.

After the combustion products have been passed through the bed 16 they are routed as before to the conventional filter 15 to remove the water vapor and $CO_2$ and supply nitrogen in the desired purified form. This is accomplished by closing valve 20 and opening valve 21.

When a substantial portion of the reactant in the bed 16 has been reduced to cuprous oxide, the system is recycled back to its former condition to route the combustion products through the bed 12. At this time the valves are readjusted accordingly.

The system may of course be made automatic through the use of an analyzer 22 adapted to monitor the condition of the reversible reactant in each bed 12 and 16. The information provided by the analyzer 22 is used to operate the valves which cycle the system back and forth between its two operating conditions.

The invention has been described with reference to preferred embodiments, however, modifications and variations will occur to others upon a reading and understanding of the specification. It is intended that all such modifications and variations be included within the scope of the present invention insofar as they are included within the appended claims.

Having thus described our invention, we claim:

1. A cyclic process for manufacturing nitrogen by burning a hydrocarbon-containing fuel in air wherein said cycle comprises the steps of:
    (a) generating an off-gas rich in CO and $H_2$, and lean in $O_2$ by providing a fuel rich combustion mix;
    (b) catalytically reacting said $O_2$ with at least a portion of said CO and $H_2$ to provide a modified off-gas essentially free of $O_2$ and and having reduced concentrations of CO and $H_2$;
    (c) contacting said modified off-gas with a regenerable oxide, reducible by $H_2$ and CO, whereby a reduction product of said oxide is formed and said modified off-gas is rendered essentially free of $H_2$ and CO;
    (d) generating an off-gas rich in $O_2$, and lean in CO and $H_2$, by providing an air rich combustion mix;
    (e) catalytically reacting said CO and $H_2$ with at least a portion of said $O_2$ to provide a second modified off-gas essentially free of CO and $H_2$ and having a reduced concentration of $O_2$; and
    (f) contacting said second modified off-gas with the reduction product formed in step (c) whereby said oxide is regenerated and said second modified off-gas is rendered essentially free of $O_2$.

2. The process as set forth in claim 1 wherein said regenerable oxide is cupric oxide and said reduction product in cuprous oxide.

3. The process as set forth in claim 1 wherein steps (b) and (e) are conducted in the presence of a nickel-containing catalyst.

4. The process as set forth in claim 1 wherein step (d) is initiated prior to the complete conversion of said reduction product in step (c).

5. A continuous, cyclic process for manufacturing nitrogen comprising the sequential repetition of steps (a), (b), (c), (d), (e) and (f) as set forth in claim 1.

References Cited
UNITED STATES PATENTS 984,605    2/1911    Reichel et al. _____ 23—220

FOREIGN PATENTS 679,169    2/1964    Canada.

OSCAR R. VERTIZ, *Primary Examiner.*

MILTON WEISSMAN, *Examiner.*

H. S. MILLER, *Assistant Examiner.*